March 27, 1945.    C. L. EKSERGIAN    2,372,415
FLUID-ACTUATED BRAKE
Filed Aug. 18, 1943
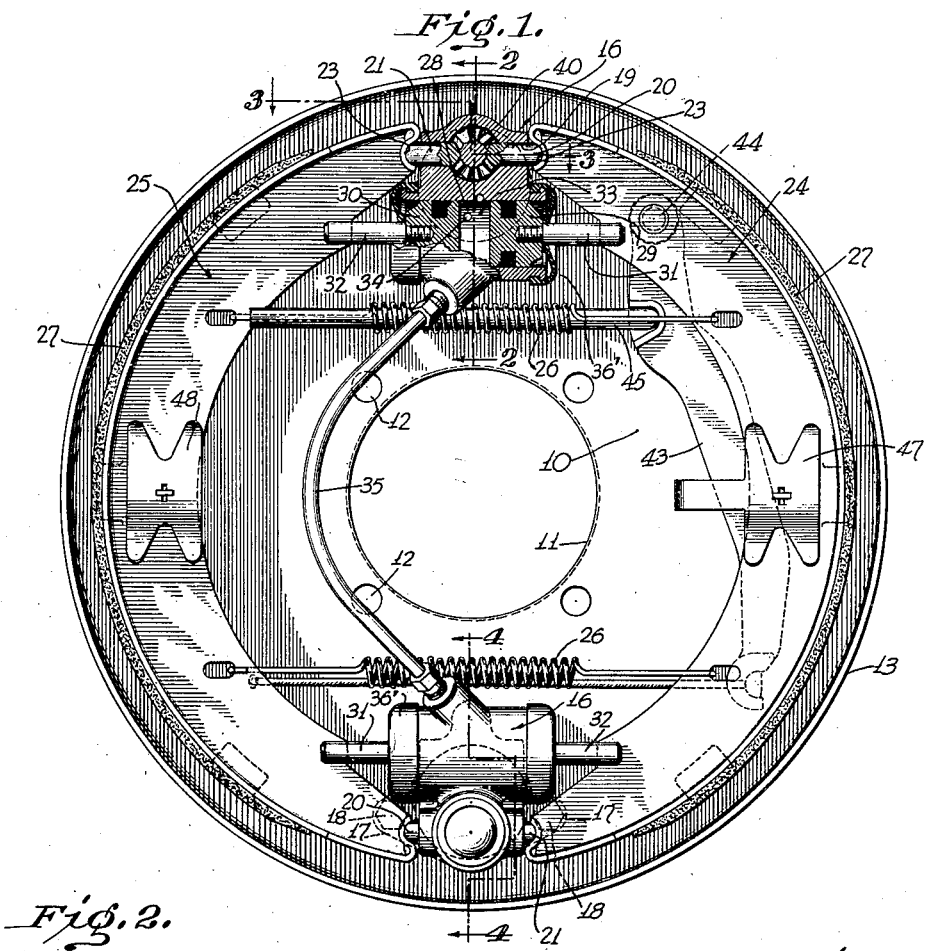
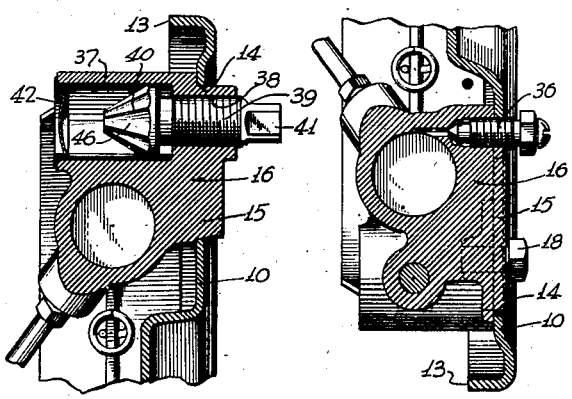
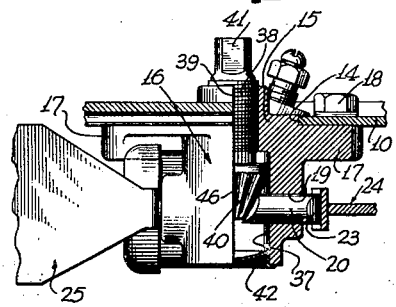
INVENTOR
Carolus L. Eksergian
BY John P. Jacobs
ATTORNEY Patented Mar. 27, 1945

2,372,415

UNITED STATES PATENT OFFICE 2,372,415

FLUID-ACTUATED BRAKE

Carolus L. Eksergian, Detroit, Mich., assignor to Budd Wheel Company, Philadelphia, Pa., a corporation of Pennsylvania Application August 18, 1943, Serial No. 499,039

4 Claims. (Cl. 188—152)

The invention relates to brakes and more particularly to fluid-actuated brakes of the internally expanding type.

It is an object of the invention to simplify the construction and manufacture of such brakes thereby reducing costs of manufacture and maintenance and reducing the overall weight.

This object is achieved in large part according to the present invention by combining the fluid actuator, the brake adjusting means and anchor in a unitary structure in which the parts are so related that they can be readily made and preassembled and, when preassembled, applied as a unit to the backing plate or other support of the brake parts and in assembled relation with the expanding brake elements.

Other and further objects and advantages and the manner in which they are attained will become apparent from the following detailed description, when read in connection with the accompanying drawing forming a part of this specification.

In the drawing,

Fig. 1 is an elevational view, parts being shown in section, of a brake mechanism embodying the invention.

Figs. 2, 3 and 4 are detail sectional views on an enlarged scale, the sections being taken approximately on the lines 2—2, 3—3 and 4—4, respectively, of Fig. 1.

The invention is shown applied to an internally-expanding brake of the type having two symmetrical free-floating shoes, both self-energizing in either direction of rotation of the drum, but it will be understood that the main features are also applicable to other types of internally expanding brakes.

Referring to the drawing, the backing plate supporting the brake parts is designated by the reference numeral 10. It is provided with the usual central opening 11 and the annular series of bolt holes 12 through which it is rigidly secured to the axle housing or other non-rotating part of a vehicle.

At its outer periphery it is provided with a flange 13 which, in assembly, is adapted to overlie the adjacent margin of the brake drum (not shown) rotating with the wheel to be braked.

Adjacent the top and bottom margins of the backing plate, are formed the openings 14, which receive the bosses 15, of top and bottom actuator blocks 16. These blocks have laterally extending lugs, as 17, Fig. 3, which form attaching faces through which the blocks are secured to the backing plates, as by bolts 18.

The engagement of the bosses 15, in the openings 14 and the clamping action of the bolts 18 securely fastens the actuator blocks to the backing plate to enable them not only to take the thrust of the actuators in applying the brakes, but also the anchoring thrusts of the shoes.

In the radially outer region of the actuator block 16, which is of somewhat less width than its inner portion, it is formed with a relatively small bore 19 extending from side to side and adapted to receive in sliding relation therein, at its opposite ends the anchor pins 20 and 21.

The outer ends of these pins may be particylindrical, Figs. 1 and 3, and engage with particylindrical recesses 23 in the adjacent ends of a pair of symmetrical brake shoes designated, respectively, 24 and 25. The brake shoes are held in engagement with the anchor pins, as described, by a pair of tensioned coil springs 26 arranged inside the respective actuator blocks.

The shoes are of the usual T-form cross section, the top of the T having secured to it the brake lining 27, and the stem of the T providing means for securing the tensioned springs 26 and to receive the thrust of the actuators.

In the radially inward region, each of the actuator blocks 16 is formed with a relatively large bore 28 generally paralleling the smaller bore 19, this larger bore forming the fluid actuating cylinder slidably receiving the opposed actuator pistons 29 and 30, the stems 31 and 32 of which project beyond the ends of the cylinder and engage the respective shoe ends to actuate them outwardly into braking engagement with the drum, whenever fluid is supplied under pressure into the chamber 33 between the pistons. This is done in a usual manner by fluid entering through a port 34, into the upper cylinder bore and passing through a pipe 35 to the space between the pistons in the lower cylinder bore. The usual bleeding port and closing plug, as 36, may be provided in connection with the cylinders, as shown. The ends of the cylinder bore may be sealed against entrance of dirt by flexible seals, as 36'.

To provide for adjustment of the shoes for wear, each of the actuator blocks 16 may be provided with a third bore at right angles to and intersecting the bore 19 receiving the anchor pins 20 and 21. This bore may be of two diameters, the inner portion being of larger diameter, as indicated at 37, and the outer portion of smaller diameter, as indicated at 38. The smaller diameter portion is screw-threaded to receive the screw-threaded stem 39 of a generally conical spreader 40 extending between the anchor pins and engaged by their inner ends. The outer end of the screw-threaded stem is formed with a squared portion 41 for receiving a wrench or other tool to adjust the spreader.

To prevent dirt from entering the open inner end of the bore 37, it may be closed by a flanged closure disc 42 pressed into the said open end.

The shoes 24 and 25 may be held against rattling on the backing plate by spring devices, as 47 and 48, similar to those described and claimed in U. S. Patent No. 2,263,949 granted Nov. 25, 1941, but any other suitable holding devices known to the art might be substituted.

In addition to the fluid-actuating devices for operating the brake shoes, an emergency operating means may be provided. This may consist as shown, of a cable-operated lever 43 pivoted at 44 adjacent one end of the shoe 24 and connected through a strut 45 engaging the lever intermediate its ends to the adjacent end of the other shoe 25. Such devices are well-known in the art and need no further description.

The operation of the improved brake mechanism will now be described. Assuming the brake drum (not shown) to be rotating in clockwise direction, and fluid being supplied under pressure between the pistons of the actuator cylinders. The first effect will be to move the shoes uniformly outwardly into engagement with the rotating drum. For convenience of description the end of the shoe which is foremost in the direction of drum rotation will be denominated the "heel" end and the opposite end the "toe" end of the shoe.

After the shoes contact the drum with sufficient friction, they are carried around with the drum to anchor at their heel ends on the respective anchor pins 21 and the toe ends of the shoes will move further away from the respective anchor pins 20. It will be obvious that each shoe is thus energized by the rotating drum and the effective braking is that due to the pressure of the fluid on the toe ends of the shoes as augmented by the self-energization due to frictional engagement with the rotating drum.

Since the shoes are symmetrically arranged and the anchoring and actuating means are disposed at diametrically opposite sides of the brake, the action in the reverse rotation of the drum, that is, in counterclockwise rotation, will be identical with that in the clockwise rotation.

The adjustment for wear is made by rotating the screwthreaded stems 39 of the spreaders 40 in a direction to force the anchor pins 20 and 21, whose inner ends rest against the conical spreader, outwardly. The spreader is locked in the adjusted position by the engagement of the inner ends of the anchor pins into the serrations 46 provided in the conical surface of the spreader. These serrations have, also the added function of serving as an indication of the amount of the adjustment, as the ends of the anchor pins click over the serrations in the adjustment.

The foregoing description makes clear that an exceedingly simple brake mechanism is produced, the simplicity being in large part due to the manner of combining the functions of actuator, anchor and adjustment all in a unit which is readily manufactured and installed as a unit in the assembly of the brake.

What is claimed is:

1. A combined anchoring and actuating unit for internally expanding brakes comprising a block adapted to be secured to a non-rotating member of the brake between adjacent ends of internally expanding brake means, said block having a radially outer bore with anchor pins slidably mounted therein and adapted to engage, at their outer ends, the adjacent ends of the associated brake means, said block further having a radially inner bore generally paralleling the radially outer bore, actuating pistons movably mounted in said second-named bore and adapted to actuate the associated brake means, and the block being further provided with a third bore intersecting the radially outer bore and having adjustable spreader means movably mounted therein and engaging the inner ends of the anchor pins.

2. A brake mechanism comprising a backing plate, a pair of symmetrical brake shoes movably supported at diametrically opposite sides of said plate, actuating and anchoring units disposed between the opposite ends of the respective shoes, the shoes being yieldingly held thereagainst, each said units comprising a block secured to the backing plate and formed with a pair of generally parallel radially spaced bores, the radially inner bore comprising an actuating cylinder, pistons movable therein and engaging the respective adjacent shoe ends for actuating the same, the radially outer bore receiving slidable anchor pins the outer ends of which are in position for anchoring coaction with the respective adjacent shoe ends, said block being formed with a third bore intersecting the central portion of the radially outer bore, and a spreader movable longitudinally of the bore and engaging the inner ends of the anchor pins and means for moving it to adjust the position of the anchor pins and, consequently, of the shoes.

3. A combined anchoring and actuating unit for internally expanding brakes comprising a block adapted to be secured to a non-rotating member of the brake between adjacent ends of internally expanding brake means, said block having generally parallel radially outer and inner bores, anchor pins slidably mounted in one of said bores and adapted to engage at their outer ends, the adjacent ends of the associated brake means, actuating pistons movably mounted in the other of said bores and adapted to actuate the associated brake means, and the block being further provided with a third bore intersecting the bore mounting said anchor pins and having adjustable spreader means movably mounted therein and engaging the inner ends of the anchor pins.

4. A brake mechanism comprising a backing plate, a pair of symmetrical brake shoes movably supported at diametrically opposite sides of said plate, actuating and anchoring units disposed between the opposite ends of the respective shoes, the shoes being yieldingly held thereagainst, each said units comprising a block secured to the backing plate and formed with a bore comprising an actuating cylinder, pistons movable therein and engaging the respective adjacent shoe ends for actuating the same and anchoring means on the opposite sides of said block for the respective adjacent shoe ends, at least one of said blocks having its anchoring means provided by anchor pins received slidably in a second bore generally paralleling its said cylinder bore and having a third bore intersecting the central portion of said second bore, and a spreader movable longitudinally of said third bore and engaging the inner ends of the anchor pins therein and means for moving it to adjust the position of said anchor pins and, consequently, of the adjacent shoe ends.

CAROLUS L. EKSERGIAN.